United States Patent
Carter

(10) Patent No.: US 7,229,093 B1
(45) Date of Patent: Jun. 12, 2007

(54) FOLDABLE CARRYING CART

(76) Inventor: Anna M. Carter, P.O. Box 10, New York, NY (US) 10029

( * ) Notice: Subject to any disclaimer, the term of this patent is extended or adjusted under 35 U.S.C. 154(b) by 189 days.

(21) Appl. No.: 10/874,600

(22) Filed: Jun. 24, 2004

(51) Int. Cl.
*B62B 3/02* (2006.01)

(52) U.S. Cl. ..................... 280/651; 280/641

(58) Field of Classification Search ............. 280/38, 280/639, 641, 651, 655, 655.1, 659, 47.34, 280/47.35, 79.3, 79.11
See application file for complete search history.

(56) References Cited

U.S. PATENT DOCUMENTS

| | | | |
|---|---|---|---|
| 3,572,742 A * | 3/1971 | Marker ..................... 280/42 |
| 3,637,232 A * | 1/1972 | Bourgraf et al. ............ 280/641 |
| 3,762,739 A | 10/1973 | Tabet |
| 4,077,644 A | 3/1978 | Roby et al. |
| 4,247,130 A | 1/1981 | Paterson |
| 4,924,782 A * | 5/1990 | Nichoalds ................ 108/27 |
| 4,974,871 A | 12/1990 | Mao |
| 5,577,744 A * | 11/1996 | Parks ....................... 280/32.6 |
| D410,577 S | 6/1999 | Ciphers, Sr. |
| 5,915,723 A * | 6/1999 | Austin ..................... 280/651 |
| D415,600 S | 10/1999 | Hsieh et al. |
| 6,024,376 A * | 2/2000 | Golichowski et al. ... 280/655.1 |
| 6,070,899 A * | 6/2000 | Gines ...................... 280/651 |
| 6,079,777 A * | 6/2000 | Simmons et al. ........ 297/217.1 |
| 6,102,433 A * | 8/2000 | Stevens ................... 280/646 |
| 6,217,043 B1* | 4/2001 | Chumley .................. 280/40 |

* cited by examiner

*Primary Examiner*—Frank Vanaman

(57) ABSTRACT

A foldable carrying cart includes a first member having substantially planar top and bottom surfaces. The first member includes a plurality of tubes selectively connected to each other and a top plate connected to the plurality of tubes. A plurality of elongated leg members are pivotally connected to the first member and are selectively movable between operating and non-operating positions. The plurality of leg members include a plurality of wheels connected thereto for allowing a user to transport the carrying cart. The cart further includes a handle having a plurality of spaced lower end portions pivotally connected to the first member and movable between up and down positions and a mechanism for locking the handle at select positions as desired by a user. The cart further includes a flexible pad removably positionable onto the top surface of the first member.

5 Claims, 4 Drawing Sheets

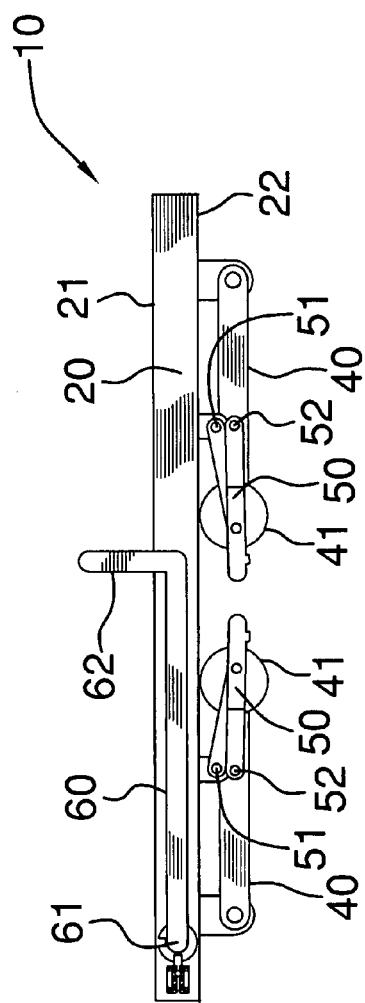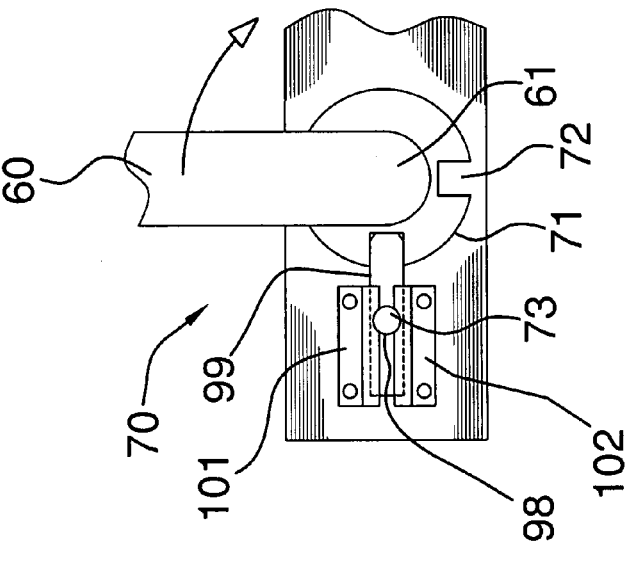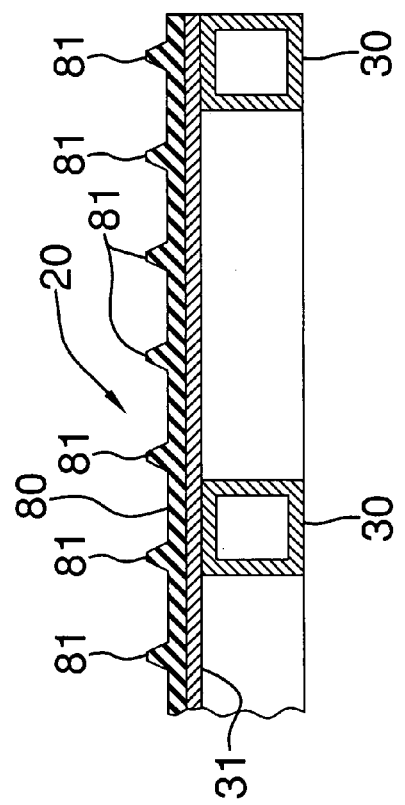

FOLDABLE CARRYING CART

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to material handling devices and, more particularly, to a foldable carrying cart for transporting goods.

2. Prior Art

Utility carts are used in a variety of commercial, residential and recreational applications. These utility carts typically include a shelf or base, a pushing handle, and a plurality of wheels or casters attached to the shelf or base. In order to improve the load capacity of conventional utility carts, many of the components are arc welded together, thereby improving strength and durability. The arc welding process is a costly one, requiring skilled labor and several welding steps, including polishing and refinishing, thereby driving up the price of the cart for the consumer.

A second drawback of arc welded utility carts is that they must be shipped assembled or substantially assembled. To reach some markets (e.g., overseas markets), shipping costs are calculated based on the volume of the items shipped. Thus, shipping a cart in its assembled state can become costly and preclude entry in these markets. A foldable cart can be shipped in approximately one-third the volume of a comparable assembled cart. Thus, a foldable cart that could be easily unfolded could open up significant markets where previously assembled carts were not competitively priced.

Another advantage of foldable carts is that they collapse to a size that is easily transported by a user. Thus, a user could collapse a cart, place it in the trunk of a vehicle, and then unload it and use it at a remote location such as a store or shipping and receiving facility. This would eliminate the necessity of trying to find a cart at the remote location or seeking help with loading and unloading. When finished loading or unloading, a user simply folds the cart up and puts it back into the trunk of the vehicle. Upon arrival at home, the cart can then be used to unload any items brought home.

Thus, it would be advantageous to provide a foldable cart that could be reduced in size for shipping, is easy to unfold by an unskilled user, and maintains the strength and durability of a heavy-duty cart. It would also be advantageous to provide a foldable cart having a simple design and being substantially free of arc welds to provide a more economical utility cart.

Accordingly, a need remains for a foldable carrying cart that is compact, portable and lightweight.

BRIEF SUMMARY OF THE INVENTION

In view of the foregoing background, it is therefore an object of the present invention to provide an apparatus for transporting heavy or bulk items from a store to a vehicle or from a vehicle to a residence or business. These and other objects, features, and advantages of the invention are provided by a foldable carrying cart for transporting goods. The cart includes a first member having substantially planar top and bottom surfaces and a centrally disposed longitudinal axis.

The first member further has opposed edge portions equally spaced from the axis and extending substantially parallel thereto. The first member further has opposed front and rear end portions integral with the edge portions respectively and extending substantially perpendicular to the axis. The first member may include a plurality of tubes selectively connected to each other and a top plate connected to the plurality of tubes. The top plate and the plurality of tubes are preferably formed from aluminum for providing a lightweight and sturdy support surface.

A plurality of elongated leg members are pivotally connected to the first member and selectively movable between operating and non-operating positions. The cart further includes a plurality of support braces having opposed end portions connected to the first member and the plurality of leg members. The plurality of support braces assist in maintaining the plurality of leg members at a substantially stable position. The plurality of leg members include a plurality of wheels connected thereto for allowing a user to readily transport the carry cart during operating conditions.

The cart further includes a handle having a plurality of spaced lower end portions pivotally connected to the first member. The handle is movable between up and down positions. The handle further has an upper end portion that extends substantially parallel to the axis for providing a gripping surface so that a user can effectively control the movement of the carrying cart. The lower end portion of the handle extends substantially vertically and upwardly from the front-end portion of the first member when moved to an up position.

The cart further includes a mechanism for locking the handle at select positions as desired by a user. The locking mechanism includes a plurality of brackets connected to the plurality of lower end portions of the handle respectively and contemporaneously rotatable therewith. The plurality of brackets have a plurality of corresponding notches formed therein and spaced about a perimeter thereof. The locking mechanism further includes a plurality of locking pins removably engageable with select ones of the plurality of notches so that the handle can be securely maintained at a corresponding position.

The cart further includes a flexible pad removably positionable onto the top surface of the first member. The pad includes a plurality of spaced protrusions extending upwardly therefrom for assisting to maintain an object on the pad during transportation.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is a side elevational view of the apparatus shown in FIG. 1 at a folded position;

FIG. 5 is a partial cross-sectional view of the first member and flexible pad, taken along line 5-5; and FIG. 6 is an enlarged side-elevational view of the locking mechanism shown in FIG. 1.

DETAILED DESCRIPTION OF THE INVENTION

Figure 1:
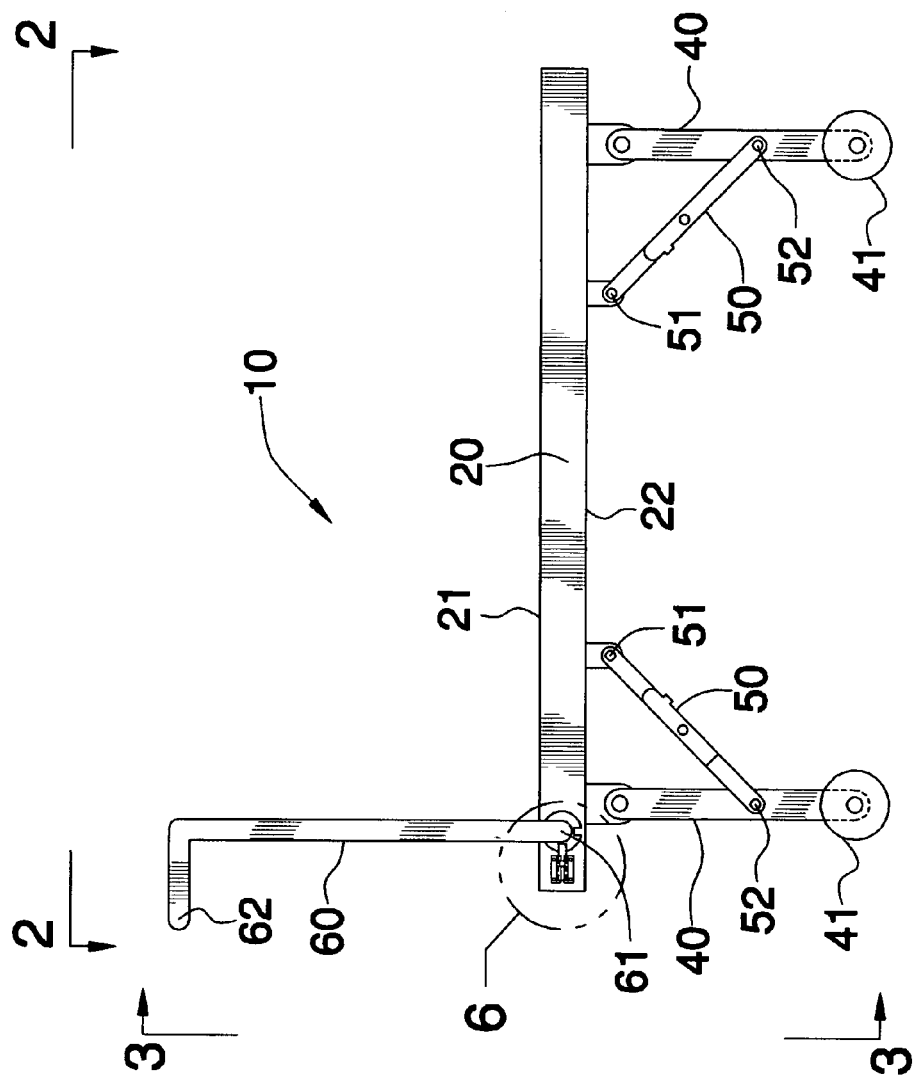
FIG. 1 is a side elevational view showing a foldable carrying cart, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide a foldable carrying cart for transporting goods. It should be understood that the cart 10 may be used to transport many different types of goods in many different applications, including residential, commercial, and recreational.

Figure 2:
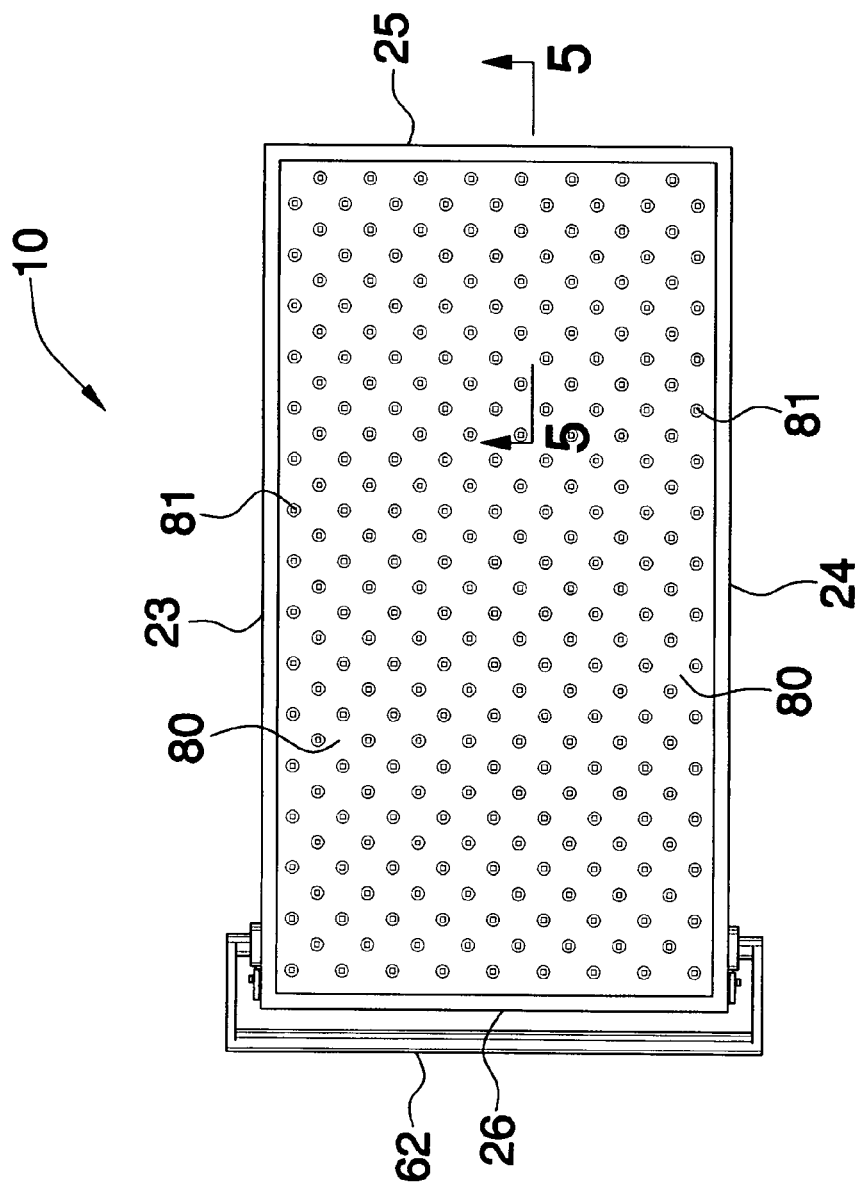
FIG. 2 is a top plan view of the apparatus shown in FIG. 1, taken along line 2-2.

Initially referring to FIG. 1, the cart 10 includes a first member 20 having substantially planar and solid top 21 and bottom 22 surfaces and a centrally disposed longitudinal axis (not shown). The first member 20 further has opposed edge portions 23, 24 equally spaced from the axis and extending substantially parallel thereto as best shown in FIG. 2. The first member 20 further has opposed front 25 and rear 26 end portions integral with the edge portions 23, 24 respectively and extending substantially perpendicular to the axis as also best shown in FIG. 2.

Now referring to FIG. 5, the first member 20 includes a plurality of tubes 30 selectively connected to each other and a top plate 31 connected to the plurality of tubes 30. The top plate 31 and the plurality of tubes 30 are preferably formed from aluminum for providing a lightweight and sturdy support surface, but may be formed from other metals or durable plastic.

Now referring back to FIG. 1, a plurality of elongated leg members 40 are pivotally connected to the first member 20 and selectively movable between operating and non-operating positions. The pivoting action of the leg members 40 enable a user to selectively fold the leg members 40 to a collapsed position, as best shown in FIG. 4, so that the cart 10 may be easily stored and transported in compact space like a vehicle trunk, for example. This allows a user to easily transport the cart to a remote location such as a store or warehouse.

Figure 3:
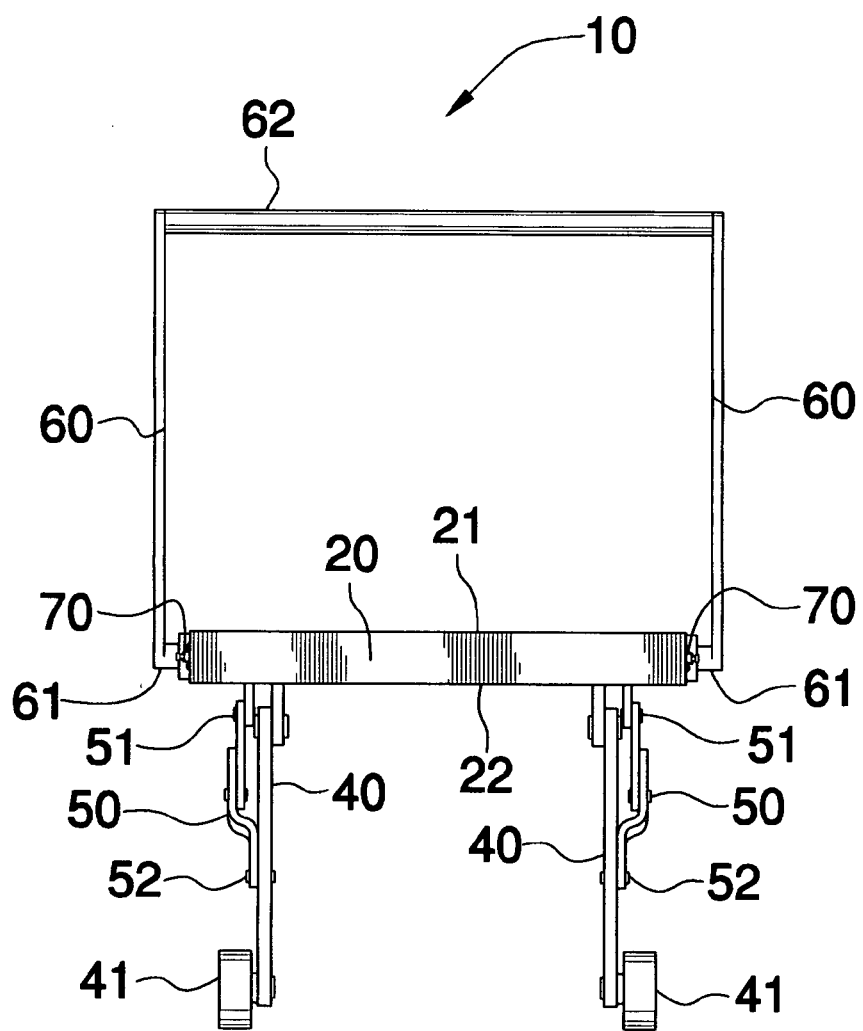
FIG. 3 is a rear elevational view of the apparatus shown in FIG. 1 taken along line 3-3.

Now referring to FIGS. 1 and 3, the cart 10 further includes a plurality of support braces 50 having opposed end portions 51, 52 connected to the first member 20 and the plurality of leg members 40. The plurality of support braces 50 assist in maintaining the plurality of leg members 40 at a substantially stable position, thereby enabling the cart 10 to support and transport heavy objects. The plurality of leg members 40 include a plurality of wheels 41 connected to said plurality of leg member 40 for allowing a user to readily transport the cart 10 during operating conditions. The wheels 41 are preferably pneumatic tires to better absorb shocks and traverse uneven terrain, but may be common steel wheels or casters, as well known in the industry.

Still referring to FIGS. 1 and 3, the cart 10 further includes a handle 60 having a plurality of spaced lower end portions 61 pivotally connected directly to the first member 20. The handle 60 is movable between up and down positions. This enables the handle to be folded flat, as best shown in FIG. 4, for easy storage of the cart 10 in a compact space like a vehicle trunk, for example. The handle 60 further has an upper end portion 62 that extends substantially parallel to the axis for providing a gripping surface so that a user can effectively control the movement of the cart 10. The lower end portion 61 of the handle 60 extends substantially vertically and upwardly from the front-end portion 25 of the first member 20 when moved to an up position.

Now referring to FIG. 6, the cart 10 further includes a mechanism 70 for locking the handle 60 at select positions as desired by a user. The locking mechanism 70 includes a plurality of brackets 71 connected to the plurality of lower end portions 61 of the handle 60 respectively and contemporaneously rotatable therewith. The plurality of brackets 71 have a plurality of corresponding notches 72 formed therein and spaced about a perimeter thereof.

The locking mechanism 70 further includes a plurality of locking pins 73 removably engageable with select ones of the plurality of notches 72 so that the handle 60 can be securely maintained at a corresponding position. This enables a user to selectively position the handle at a position most comfortable for him/her or one that accommodates the goods being transported. The positioning of the handle 60 also helps reduce the possibility of incurring back strain by providing leverage to a user while operating the cart 10 in a fully loaded condition.

Wherein the locking pins 73 have longitudinal lengths extending parallel to the axis of the first member 20. A plurality of linear support rails 101, 102 are directly coupled to the sides of the first member 20 and are spaced apart for defining a passageway therebetween. Each of the locking pins 73 have a first linear arm 99 and a second linear arm 98 monolithically coupled thereto and arranged in such a manner that the first linear arm 99 slidably glides along the passageway while the second linear arm 98 protrudes outwardly therefrom. The support rails 101, 102 have longitudinal lengths greater than a longitudinal length of the first arms 99 so that the first arms 99 become intermediately disposed along the passageway and spaced between axially opposed ends of the support rails 101, 102.

Now referring to FIGS. 2 and 5, the cart 10 further includes a flexible pad 80 removably positionable onto the top surface 21 of the first member 20. The pad 80 includes a plurality of spaced protrusions 81 extending upwardly therefrom for assisting to maintain an object on the pad 80 during transportation. The protrusions 81 of the pad 80 provide a gripping surface that helps prevent objects placed thereon from sliding off the top surface 21 of the first member 20.

The cart 10 is easy to use, lightweight, and allows busy homeowners to save time and energy when transporting goods. The cart 10 is particularly useful to elderly people or single women who live alone for transporting groceries from a vehicle to a residence. At most grocery stores, assistance is available to such people for loading the groceries into their vehicle, however, upon arriving at home, there may not be any such assistance available. The cart 10 meets this need in a cost effective, safe, and efficient manner.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A carrying cart for transporting goods and comprising:
   a first member having substantially planar and solid top and bottom surfaces and a centrally disposed longitudinal axis, said first member further having opposed edge portions equally spaced from the axis and extending substantially parallel thereto, said first member further having opposed front and rear end portions integral with said edge portions respectively and extending substantially perpendicular to the axis;
   a plurality of elongated leg members pivotally connected to said first member and being selectively movable between operating and non-operating positions, said plurality of leg members comprising
   a plurality of wheels connected said plurality of leg members for allowing a user to readily transport said carry cart between remote positions;
   a plurality of support braces having opposed end portions connected to said first member and said plurality of leg members, said plurality of support braces for maintaining said plurality of leg members at a substantially stable position;
   a handle having a plurality of spaced lower end portions pivotally connected directly to said first member and being movable between up and down positions, said handle having an upper end portion for providing a gripping surface so that a user can effectively control the movement of said carrying cart; and
   means for locking said handle at select positions as desired by a user, said locking means comprising
   a plurality of brackets connected to said plurality of lower end portions of said handle respectively and being contemporaneously rotatable therewith, said plurality of brackets having a plurality of corresponding notches formed therein and spaced about a perimeter thereof,
   a plurality of locking pins removably engageable with select ones of said plurality of notches so that said handle can be securely maintained at a corresponding position, wherein said locking pins have longitudinal lengths extending parallel to the axis of said first member, and
   a plurality of linear support rails directly coupled to said sides of said first member and being spaced apart for defining a passageway therebetween, each of said locking pins having a first linear arm and a second linear arm monolithically coupled thereto and arranged in such a manner that said first linear arm slidably glides along said passageway while said second linear arm protrudes outwardly therefrom, said support rails having longitudinal lengths greater than a longitudinal length of said first arms so that said first arms become intermediately disposed along said passageway and spaced between axially opposed ends of said support rails.

2. The carrying cart of claim 1, further comprising:
   a flexible pad removably positionable onto said top surface of said first member, said pad including a plurality of spaced protrusions extending upwardly therefrom and for assisting to maintain an object on said pad during transportation.

3. The carrying cart of claim 1, wherein said upper end portion of said handle extends substantially parallel to the axis.

4. The carrying cart of claim 1, wherein said lower end portion of said handle extends substantially vertically and upwardly from said front end portion of said first member when moved to an up position.

5. The carrying cart of claim 1, wherein said first member comprises:
   a plurality of tubes selectively connected to each other; and
   a top plate connected to said plurality of tubes, said top plate and said plurality of tubes being formed from aluminum for providing a light-weight and sturdy support surface.

* * * * *